(12) United States Patent
Yokoyama

(10) Patent No.: US 8,137,596 B2
(45) Date of Patent: Mar. 20, 2012

(54) SURFACE-COATED TITANIUM DIOXIDE SOL, PROCESS FOR PRODUCING THE SAME AND COATING COMPOSITIONS CONTAINING THE SAME

(75) Inventor: Nobuyuki Yokoyama, Osaka (JP)

(73) Assignee: Tayca Corporation, Osaka (JP)

( * ) Notice: Subject to any disclaimer, the term of this patent is extended or adjusted under 35 U.S.C. 154(b) by 121 days.

(21) Appl. No.: 12/595,947

(22) PCT Filed: Sep. 10, 2007

(86) PCT No.: PCT/JP2007/067575
§ 371 (c)(1),
(2), (4) Date: Oct. 14, 2009

(87) PCT Pub. No.: WO2008/129693
PCT Pub. Date: Oct. 30, 2008

(65) Prior Publication Data
US 2010/0148135 A1 Jun. 17, 2010

(30) Foreign Application Priority Data
Apr. 17, 2007 (JP) ................................. 2007-107683

(51) Int. Cl.
*F21V 9/04* (2006.01)
*F21V 9/06* (2006.01)
*G02B 5/22* (2006.01)
*G02B 5/26* (2006.01)

(52) U.S. Cl. ........ 252/589; 106/436; 106/438; 106/441; 106/446

(58) Field of Classification Search .................. 252/589; 106/446, 438, 441, 287.19, 436; 424/59, 424/401; 428/338, 402; 516/90
See application file for complete search history.

(56) References Cited

U.S. PATENT DOCUMENTS
6,534,044 B1 3/2003 Wada et al.
6,626,987 B1 9/2003 Suzuki FOREIGN PATENT DOCUMENTS
JP 2001-122621 A 5/2001
JP 2003-192348 A 7/2003
JP 2006-342311 A 12/2006
WO WO 00/42112 A1 7/2000

OTHER PUBLICATIONS

English language translation of International Preliminary Report on patentability, Nov. 10, 2009.
English Language Machine Translation of JP 2006342311A.
English Language Machine Translation of JP 2003192348A.
International Search Report, Oct. 16, 2007.

*Primary Examiner* — Mark Kopec
*Assistant Examiner* — Bijan Ahvazi
(74) *Attorney, Agent, or Firm* — Cook Alex Ltd.

(57) ABSTRACT

A transparent titanium oxide in which the titanium oxide particles have been coated with a hydrated metal oxide having no photocatalytic activity in order to block photocatalytic activity. Hydrous titanium oxide sol particles are coated with a layer comprising a hydrated oxide of silicon. The coating layer can further contain a hydrated oxide of at least one metal selected among tin, aluminum, and zirconium and a hydrated oxide of antimony. Also provided are a process for producing a sol of surface-coated transparent titanium oxide and a coating composition containing a sol of surface-coated transparent titanium oxide.

16 Claims, No Drawings

SURFACE-COATED TITANIUM DIOXIDE SOL, PROCESS FOR PRODUCING THE SAME AND COATING COMPOSITIONS CONTAINING THE SAME

This is a national stage of International Application No. PCT/JP2007/067575 filed on Sep. 10, 2007, which claims priority to Japanese Patent Application Serial No. 2007-107683 filed on Apr. 17, 2007, both of which are incorporated herein by reference in their entireties.

FIELD OF THE INVENTION

The present invention relates to a transparent titanium dioxide sol which is useful for forming a hard and transparent coating layer having a high refractive index on the surface of a transparent plastic substrate such as lenses.

BACKGROUND ART

A large quantity of titanium dioxide of both the anatase and rutile types has long been manufactured and consumed as a white pigment. The pigment-grade titanium dioxide has an average particle size from about 0.1 µm to about 0.3 µm and exhibits a high hiding power compared to other white pigments. Titanium dioxide particles having a diameter less than 0.1 µm exhibit a unique property of selectively blocking the passage of ultraviolet rays while transmitting visible light. By virtue of this property, they are formulated in cosmetic preparations for preventing suntan. Much attention has been drawn in recent years to a high photocatalytic activity of titanium dioxide. Anatase-type titanium dioxide is mainly used for this purpose owing to its higher photoactivity than other types. Sols of anatase-type titanium dioxide have been used for forming a coating film having photocatalytic function on a substrate. Various production methods and usage of the photocatalyst film are described in many patent documents.

The titanium dioxide sols also find use as a hard coat or an anti-reflection film on optical elements requiring high transparency, high adhesion strength with substrates, high refractive index and high scratch resistance. Sols of anatase-type titanium dioxide have been mainly used for this purpose owing to their higher transparency than rutile-type titanium dioxide sols. However, the anatase-type titanium dioxide sols are disadvantageous in that they act on an organic material such as plastics to decompose and color due to high photocatalytic activity. While the photocatalytic activity may be reduced by coating the sol particles with a hydrated metal oxide, this coating compromises the transparency of the sol. It is desirable to provide a surface-treated titanium sol having decreased photocatalytic activity while retaining the transparency of the sol before surface treating in order to expand the application field of the titanium dioxide sols.

Methods for producing the titanium dioxide sol are known in the art. The method generally comprises the steps of hydrolyzing a water-soluble titanium salt, neutralizing and washing the hydrolyzate to produce hydrated titanium dioxide. The sol is prepared from hydrated titanium dioxide by (1) peptizing with hydrochloric or other strong acids, or (2) dissolving as complex ions by adding complexing agents such as hydrogen peroxide and then heating the solution. The titanium dioxide sols prepared by the above method are either anatase type or amorphous type. Rutile-type titanium dioxide sols are generally produced by treating the hydrated titanium oxide prepared by the neutralization of a water-soluble titanium salt with an alkali, and aging with an acid. The resulting rutile-type titanium dioxide sol is not comparable to the anatase-type titanium dioxide sol in terms of transparency because removal of salt contaminants produced in the production process is hardly possible.

Titanium dioxide particles, irrespective of anatase or rutile type, contacting with organic materials such as plastics require to be coated with a photocatalytic activity-free hydrated metal oxide to retard or decrease their photocatalytic activity. Example of metal oxides that have been proposed for this purpose include $SiO_2$, $ZrO_2$, $SnO_2$, $WO_3$, $Al_2O_3$, $Sb_2O_5$ and their double oxides. See, for example, JP 63/185820A, JP 04/214028A, JP 10/245225A, JP 10/310429A, JP 10/158015A, JP 2000/53421A, JP 2000/62119A, JP 2001/122621A, JP 2002/363442A and JP 2006/306980A. However, coating the titanium dioxide sol with these metal oxides compromises high transparency and high refractive index inherently possessed by the titanium dioxide sol. Furthermore, the resulting products are not satisfactory in light resistance or stability. A need exists for provision of surface-coated titanium dioxide sols free from the above disadvantages.

BRIEF SUMMARY OF THE INVENTION

The present invention provides a transparent titanium dioxide sol comprising titanium dioxide sol particles having a coating layer comprising at least hydrated silica. The coating layer may comprise a combination of hydrated silica and at least one hydrated oxide of a metal selected from the group consisting of tin, aluminum and zirconium. The coating layer may also comprise a combination of hydrated silica, at least one hydrated oxide of a metal selected from the group consisting of tin, aluminum and zirconium, and hydrated antimony oxide.

In another aspect, the present invention provides a process for producing said transparent titanium dioxide sol. The process comprises the steps of (a) adding to a titanium dioxide sol produced by peptizing hydrated titanium dioxide a stabilizing agent selected from the group consisting of an alkoxy silane compound of the formula:

wherein R' is $C_1$-$C_8$ alkyl, glycidoxy-substituted $C_1$-$C_8$ alkyl or $C_2$-$C_8$ alkenyl, X is an alkoxy, and n is 1 or 2, and a compound capable of complexing titanium dioxide;

(b) adding said stabilized titanium dioxide sol portionwise to a solution of water-soluble silicate salt or silica sol containing an amount of alkali sufficient to make the mixture alkaline at a pH higher than 9 after said stabilized titanium dioxide sol has been added, followed by adjusting the pH of said mixture to 8 or lower than 8; and (c) desalting said mixture.

When the titanium dioxide sol is coated with hydrated silica in conjunction with hydrated oxide of a metal species selected from the group consisting of tin, aluminum and zirconium, a water-soluble salt or oxide sol of a metal selected from the group consisting of tin, aluminum and zirconium is added to a solution of water-soluble silicate salt or silica sol while keeping the pH higher than 9 after the stabilized titanium dioxide sol has been added in step (b). Similarly when intended to coat the titanium dioxide sol with hydrated silica sol in conjunction with hydrated oxide of a metal species selected from the group consisting of tin, aluminum and zirconium and hydrated antimony oxide, a preformed antimony pentaoxide sol is added to the reaction mixture prior to, simultaneously with or subsequent to the addition of said water-soluble salt or oxide sol of said metal species to said solution of water-soluble silicate salt or silica sol.

The surface-coated titanium dioxide sol thus prepared may be converted to an organosol by any solvent substitution method known per se in the art.

The dispersion medium of the surface-coated titanium dioxide sol of the present invention may be either water or an organic solvent. The titanium dioxide organosol may be obtained by subjecting the hydrosol to solvent substitution with an organic solvent.

BEST MODE FOR CARRYING OUT THE INVENTION

It is important for the transparency of titanium dioxide sols coated with a hydrated metal oxide not only that the coating layer is highly transparent but also that the sol particles of nanometer size do not agglomerate into larger secondary particles during the coating process. The latter condition is also important for long term light resistance or light stability of hard coat films produced from the coated titanium dioxide sol.

One of characteristic features of the present invention resides in the use of an alkoxy silane compound or a compound capable of complexing titanium dioxide to stabilize the titanium dioxide hydrosol. Then the sol particles of titanium dioxide thus stabilized are coated with a hydrated metal oxide.

By virtue of stabilizing the titanium dioxide sol, it becomes possible to coat the titanium dioxide sol particles with hydrated silica alone or a combination of hydrated silica and one or more hydrated oxide of other metal species without compromising the transparency of the starting sol.

Any type of titanium dioxide, anatase, rutile or amorphous, may be used though rutile type is advantageous by virtue of relatively high refractive index and relatively low photocatalytic activity.

Generally the rutile-type titanium dioxide hydrosol may be produced by peptizing hydrated titanium dioxide (orthotitanic acid) containing hydrated tin oxide as a transitional agent to rutile with a strong acid, typically hydrochloric acid. The starting hydrated titanium dioxide may be produced, as is well-known in the art, by neutralizing or thermally hydrolyzing a solution of water-soluble titanium salt such as titanium tetrachloride, titanium oxychloride or titanium sulfate, or hydrolyzing a titanium alkoxide.

The starting hydrated titanium dioxide may contain up to 10%, preferably up to 5%, for example 3% by weight of hydrated or anhydrous zirconium dioxide calculated as $ZrO_2$ relative to the hydrated titanium dioxide calculated as $TiO_2$. The inclusion of zirconium dioxide into hydrated titanium dioxide has an effect of enhancing the storage-stability (i.e. effect of preventing viscosity increase with time) of titanium dioxide hydrosol produced therefrom.

According to one preferred embodiment, the rutile-type titanium dioxide hydrosol may be produced by hydrolyzing a water-soluble stannic salt such as stannic chloride, adding dropwise an aqueous solution containing titanium oxychloride and zirconium oxychloride at the aforementioned $ZrO_2/TiO_2$ ratio to the above hydrolyzate solution of a water-soluble stannic salt, and heating the mixture for several hours at the boiling temperature.

The resulting reaction mixture is further processed to prepare the titanium dioxide hydrosol. After cooling, the reaction mixture is neutralized with ammonia water and then filtered to collect precipitates as filter cake. After thoroughly washing with water, the filter cake is peptized again with concentrated hydrochloric acid and water. Alternatively, the titanium dioxide hydrosol may be prepared by removing electrolyte components from the cooled reaction mixture by, for example, repeating the steps of decantation, dilution, concentration and dilution with deionized water.

Highly transparent rutile-type titanium dioxide hydrosol may be obtained by using a tin compound as a transitional agent. The rutile-type titanium dioxide hydrosol may be obtained without using a tin compound by altering the reaction conditions for the hydrolysis of titanium oxychloride. The amount of a water-soluble stannic salt added as a transitional agent is 5-20%, preferably 5-15%, particularly 10% by weight calculated as $SnO_2$ relative to $TiO_2$.

Examples of titanium sources for the production of titanium dioxide hydrosol further include titanium oxysulfate, titanium nitrate and other water-soluble titanium salts. Examples of tin sources include a water-soluble stannic salt such as stannic sulfate or stannic nitrate. Examples of zirconium sources include a water-soluble zirconium salt such as zirconium oxysulfate. Examples of neutralizing agents include alkalis such as sodium hydroxide or potassium hydroxide, and acids such as nitric acid or oxalic acid.

According to the present invention, the titanium dioxide hydrosol is not coated as such but coated, as described above, after reacting with an alkoxy silane compound or a complexing agent for titanium dioxide. The alkoxysilane compound to be used is represented by the formula:

$$R^1{}_n SiX_{4-n}$$

wherein $R^1$ is $C_1$-$C_8$ alkyl, glycidoxy-substituted $C_1$-$C_8$ alkyl or $C_2$-$C_8$ alkenyl, X is alkoxy and n is 1 or 2.

Examples of alkoxysilane compounds suitable for the purpose of the present invention include glycidoxy-alkyl trialkoxysilanes represented by 3-glycidoxypropyltrimethoxysilane, vinyltrialkoxysilanes represented by vinyltrimethoxysilane, and alkyltrialkoxysilanes represented by methyltrimethoxysilane. These alkoxysilane compounds have been found to be effective for stabilizing the sol without compromising the parency thereof. Example of complexing agents for titanium dioxide include hydrogen peroxide; aliphatic or aromatic hydroxycarboxylic acids such as citric acid, tartaric acid or salicylic acid; dicarboxylic acid such as oxalic acid; and polyhydric alkohols such as ethylene glycol, propylene glycol or glycerine. Hydrogen peroxide, citric acid and oxalic acid are preferable.

The stabilizing agent is added to diluted titanium dioxide hydrogel and mixed therewith. The amount thereof needed for the stabilization ranges 1-100%, preferably 5-20% by weight of the titanium dioxide hydrosol calculated as $TiO_2$.

Then the titanium dioxide hydrosol containing the stabilizer is gradually added with stirring to a solution of water-soluble silicate salt such as sodium silicate or a silica sol solution. The titanium dioxide hydrosol containing the stabilizer is strongly acidic. For this reason it is preferable for the water-soluble silicate solution or silica solution to contain a calculated amount of alkali sufficient to maintain the reaction mixture at a pH above 9, preferably at a pH 10 or above during and after the reaction.

When the titanium dioxide hydrosol is to be coated with hydrated silica in conjunction with one or more hydrated oxides selected from the group consisting of tin oxide, aluminum oxide and zirconium oxide, a solution containing one or more water-soluble salts of these metals or at least one oxide sol of these metals is gradually added with stirring to the solution of water-soluble silicate salt or silica sol after the addition of titanium dioxide hydrosol has been completed. It is also preferable in this case to maintain the reaction mixture at a pH 9-11, for example, at pH 10 throughout the reaction period by adding dropwise an acid such as hydrochloric acid, sulfuric acid or a carboxylic acid, or an alkali such as sodium hydroxide, ammonia water or an organic amine.

When the titanium dioxide hydrosol is to be coated with hydrated silica in conjunction with one or more hydrated oxides selected from the group consisting of tin oxide, aluminum oxide and zirconium oxide and further with hydrated antimony oxide, a preformed antimony pentaoxide sol is added to the solution of water-soluble silicate salt or silica sol before, simultaneously with or after the addition of a solution containing one or more water-soluble salts of tin, aluminum and zirconium, or one or more hydrated oxide sols of these metals. It is preferable to add first the preformed antimony pentaoxide sol to the solution of water-soluble silicate salt or silica sol.

The reaction mixture is then heated to a temperature above 60° C., for example to 80° C., and made weak alkaline, for example, at pH 8.0 to allow completion of the reaction. An additional amount of the water-soluble silicate solution or silica sol solution may optionally be added to the mixture before heating.

The ratio of the water-soluble silicate salt or silica sol calculated as $SiO_2$ to the titanium oxide hydrosol calculated as $TiO_2$ may vary from 5 to 100% by weight. However, the ratio ranges preferably from 10 to 60% by weight and more preferably from 10 to 40% by weight. The ratio of the sum of water-soluble salts or oxide sols of tin, aluminum and zirconium calculated as $SnO_2$, $Al_2O_3$ and $ZrO_2$ to the water-soluble silicate salt or silica sol calculated as $SiO_2$ may vary from 1 to 100% by weight. However, the ratio ranges preferably from 1 to 50% by weight and more preferably from 2 to 40% by weight. If the amount of water-soluble silicate salt or silica sol is not enough, the stability of surface-coated titanium dioxide sol is not fully improved. Conversely, if the amount of water-soluble silicate salt or silica sol is excessive, the titanium dioxide content in the films produced from the coated titanium dioxide sol becomes too low to exhibit a high refractive index. If the amount of sum of water-soluble salts or oxide sols of tin, aluminum and zirconium is not enough, the light resistance of the film made from the coated sol is not sufficiently improved. Conversely, if the amount of water-soluble salts or oxide sols of these metals is excessive, the stability of surface-coated titanium dioxide sol is adversely affected and/or the transparency and refractive index of the film made from the coated sol may be adversely affected. The ratio of antimony pentaoxide sol calculated as $Sb_2O_5$ to the titanium oxide hydrosol calculated as $TiO_2$ ranges generally from 0.5 to 15% by weight, preferably from 0.5 to 10% by weight and more preferably from 0.5 to 5% by weight. If the amount of antimony pentaoxide is not enough, the long term light resistance is not sufficiently improved. Conversely, if the amount of antimony pentaoxide is excessive, the coating composition may be yellowed by irradiation with light and thus light resistance is decreased with time.

The reaction mixture containing the titanium dioxide hydrosol coated with at least hydrated silica is cooled, adjusted at an acid pH, for example, at pH 3, and subjected to the treatment for removing electrolyte contaminants from the mixture (desalting) by any known method such as ultrafiltration, dialysis, or treatment with ion exchange resins. Thereafter the surface-coated titanium dioxide sol is neutralized to a pH from 4 to 10 with ammonia water, a water-soluble amine or quaternary ammonium base to enhance the stability of surface-coated titanium dioxide sol. Examples of neutralizing agents used for this purpose include ammonia water, alkylamines such as t-butylamine, isopropylamine, diisopropylamine, or diethylamine; alkanolamines such as diethanolamine or triethanolamine; tetramethylammonium hydroxide; and dispersants having one or more amino groups. Alkylamines are preferable.

The dispersion medium of the surface-coated titanium dioxide sol produced by the above process is water (hydrosol). The hydrosol may be transformed into an organosol by the known solvent substitution method. The organic solvents for substitution are preferably water-miscible solvents. Methanol is typical. Once the hydrosol is solvent substituted with a water-miscible organic solvent, the resulting organosol may further be solvent substituted with a water-immiscible organic solvent such as toluene.

When the coated titanium dioxide sol of the present invention is an organosol, the stability thereof may be enhanced by treating the outermost surfaces with an organosilane compound of the formula:

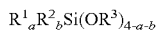

$$R^1_a R^2_b Si(OR^3)_{4-a-b}$$

wherein $R^1$ is vinyl group; a $C_1$-$C_6$ hydrocarbon group having methacryloyloxy, methacryloyloxy glycidoxy, mercapto, amino or epoxy group; or a $C_1$-$C_8$ hydrocarbon group; $R^2$ is a $C_1$-$C_4$ hydrocarbon group, $R^3$ is a $C_1$-$C_8$ hydrocarbon group or an acryl group, a and b are independently 0 or 1. The above organosilane compound may be used as such or after partially or completely hydrolyzing. Examples of the organosilane compounds include tetramethoxysilane, tetraethoxysilane, methyltrimethoxysilane, ethyltrimethoxysilane, dimethyldimethoxysilane, isobutyltrimethoxysilane, vinyltrimethoxysilane, 3-glycidoxypropyltrimethoxysilane, 3-glycidoxypropylmethyldimethoxysilane, phenyltrimethoxysilane, (3,4-epoxycyclohexyl)ethyltrimethoxysilane, 3-methacryloyloxypropyltrimethoxysilane, 3-aminopropyltrimethoxysilane, and 3-mercaptopropyltrimethoxysilane. The organosilane compound may contain, if necessary, a conventional additive such as dispersant provided that the transparency and light resistance is not adversely affected.

The surface-coated titanium dioxide sol of the present invention may be formulated into a coating composition together with an inorganic or organic binder for forming a hard coat film having a high refractive index, a reflection-preventing film or transparent scratch-resistance film on a variety of optical elements. When the titanium dioxide sol is coated with a mixture of metal oxides containing hydrated antimony oxide, the light resistance of coating composition or film is improved or yellowing thereof with time is decreased compared with the metal oxide mixture free from antimony oxide.

The coating composition comprises the surface-coated titanium dioxide sol of the present invention and a curable binder. Any binder material may be employed so long as the transparency of the titanium dioxide sol is not compromised. Examples of binder materials include photocurable or heat curable organic monomers, oligomers or polymers including acrylic, melamine, urethane and polyester resins and UV curable compositions. The partial and/or complete hydrolysate of the aforementioned organosilane of the formula:

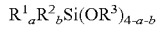

$$R^1_a R^2_b Si(OR^3)_{4-a-b}$$

wherein all symbols are defined as above, may also be employed as the binder material.

The proportions of the surface-coated titanium dioxide sol and the binder in the coating composition represented by the ratio of the coated titanium dioxide sol as solids to the binder as solids range from 0.1 to 10 and preferably from 0.2 to 5. If the above ratio is less than 0.1, films having a high refraction index cannot be obtained. Conversely, if the ratio is greater than 10, the adhesion strength of the film to a substrate is unacceptably decreased. The coating composition comprising the coated titanium dioxide sol of the present invention may contain, if necessary, a curing agent, an acid, an amine or a metal oxide sol of silicon, aluminium, zirconium, cerium, iron or tungsten, and a variety of conventional additives. The coating composition may be applied on a variety of glass or plastic substrates. Specifically, the coating composition may be applied on eyeglass lenses, camera lenses, FPD lenses for the purpose of forming a hard coat or reflection-preventing film thereon.

EXAMPLES

The following examples are not intended to limit the present invention thereto. All parts and percents therein are by weight unless otherwise indicated.

Example 1

Part 1. Rutile-type Titanium Dioxide Hydrosol (Liquid A).

To a 1 L glass beaker were added 240 g of aqueous solution of titanium oxychloride having a $TiO_2$ concentration of 25% (60 g as $TiO_2$) and 5 g of aqueous solution of zirconium oxychloride having a $ZrO_2$ concentration of 35% (1.8 g as $ZrO_2$). The mixture was diluted with water to a total volume of 1 L and the complete dissolution of the titanium and zirconium salts was confirmed. Separately, to a 2 L flask equipped with stirring means and a reflux condenser were added 1 kg of water, 20 g of aqueous solution of stannic chloride having a $SnO_2$ concentration of 30% (6 g as $SnO_2$), and 16 g of 36% hydrochloric acid. The mixture was heated to 60° C. with stirring. To the mixture was added dropwise 1 L of the aqueous solution containing titanium oxychloride and zirconium oxychloride prepared as above for a period of 15 minutes while keeping the temperature at 60° C. After the addition, the mixture is heated to the boiling temperature and refluxed for 3 hours. Thereafter the mixture was cooled to 40° C. and neutralized with ammonia water to a pH of 5.0. The resulting precipitate was collected by filtration as a cake and washed with water. The cake was diluted with water and 35% hydrochloric acid to a $TiO_2$ concentration of 20% whereupon 300 g of titanium dioxide hydrosol (Liquid A) having a pH of 1.3 was obtained. The x-ray diffraction pattern of dried powder obtained by drying Liquid A at 100° C. demonstrated the rutile crystalline form.

Part 2. Titanium Dioxide Hydrosol Treated with a Silane Coupling Agent (Liquid B)

200 g (40 g as $TiO_2$) of rutile-type titanium dioxide hydrosol having a $TiO_2$ concentration of 20% (Liquid A) was taken in a 2 L glass beaker and diluted with deionized water to a $TiO_2$ concentration of 4%. Then 5.2 g of 3-glycidoxypropyltrimethoxysilane (KBM-403, Shin-Etsu Chemical Industry Co., Ltd.) was added dropwise for a period of 10 minutes while stirring to obtain the title liquid.

Part 3. Coating of Titanium Dioxide Hydrosol 60 g of aqueous solution of sodium silicate having a $SiO_2$ concentration of 10% (6 g as $SiO_2$) and 2 g of 48% sodium hydroxide solution in water were placed in a 5 L glass beaker and diluted with deionized water to a total quantity of 1200 g. To this solution was added dropwise the whole amount of Liquid B (40 g as $TiO_2$) with stirring for a period of 15 minutes. The final pH of the mixture was 10.

Then 30 g of aqueous solution of stannic chloride having a $SnO_2$ concentration of 20% (6 g as $SnO_2$) was added dropwise to the above reaction mixture requiring 90 minutes. The reaction mixture was kept at a pH of 10 throughout the reaction by concurrently adding a required amount of 48% aqueous solution of sodium hydroxide.

After the addition of stannic chloride solution, the reaction mixture was heated to 80° C. and adjusted the pH at 8 by adding 1% hydrochloric acid dropwise for a period of 120 minutes. After cooling to 20° C., the reaction mixture was acidified to pH 3 with 10% aqueous solution of citric acid and subjected to ultrafiltration process using a ultrafiltration module (Model SLP-1053, Asahi Kasei Chemical Co., Ltd.). The ultrafiltration was continued until a $TiO_2$ concentration of 6% and an electroconductivity less than 600 µS/cm were reached in the sot while replenishing the same volume of fresh water as the filtrate removed.

The resulting desalted hydrosol was kept reflux state for 3 hours, cooled to 40° C., neutralized with diisopropylamine to pH 5, and finally concentrated to solids content of 20% using a ultrafiltration module. A titanium dioxide hydrosol coated with $SiO_2$ and $SnO_2$ in the form of hydrates both at a proportion of 15% by weight of $TiO_2$ was obtained.

Example 2

The Titanium dioxide hydrosol produced in Example 1 was diluted with methanol to a $TiO_2$ concentration of 5% and subjected to solvent substitution process using an ultrafiltration module (Model SLP-1053, Asahi Kasei Chemical Co., Ltd.) while replenishing the same volume of methanol as the filtrate. Finally, the supply of replenishing methanol was stopped and the sol was concentrated to obtain an organosol of titanium dioxide in methanol having 20% solids and a water content less than 1%.

Example 3

In Part 3 of Example 1, the addition of aqueous solution of stannic chloride and aqueous solution of sodium silicate was dispensed with. Except this the procedure of Example 1 was followed to obtain a titanium dioxide hydrosol coated with $SiO_2$ in the form of hydrate at a proportion of 15% by weight of $TiO_2$.

Example 4

Using the titanium dioxide hydrosol obtained in Example 3, the procedure of Example 2 was followed to obtain a titanium dioxide organosol in methanol having 20% solids.

Example 5

The procedure of Example 1 was followed except that the amounts of both the aqueous solution of stannic chloride and the aqueous solution of sodium silicate were doubled (60 g and 120 g, respectively). A titanium dioxide hydrosol coated with $SiO_2$ and $SnO_2$ in the form of hydrate both at a proportion of 30% by weight of $TiO_2$ was obtained.

The above hydrosol was then converted to an organosol in methanol having 20% solids by following the procedure of Example 2.

Example 6

The procedure of Example 1 was followed except that the amount of the aqueous solution of sodium silicate was doubled (120 g) and the addition of aqueous solution of stannic chloride was dispensed with in Part 3. A titanium dioxide hydrosol coated with $SiO_2$ in the form of hydrate at a proportion of 30% by weight of $TiO_2$ was obtained. Then the hydrosol was converted to an organosol of 20% solids in methanol by following the procedure of Example 2.

Example 7

The procedure of Example 1 was followed except that the aqueous solution of stannic chloride was replaced in Part 3 with 10 g (2 g as $Al_2O_3$) of an aqueous solution of sodium aluminate containing 20% solids as $Al_2O_3$. The sodium aluminate solution was added dropwise with concurrent addition of 36% hydrochloric acid requiring 15 minutes while keeping the reaction mixture at pH 9-10. A titanium dioxide hydrosol coated with $SiO_2$ and $Al_2O_3$ at a proportion of 15% and 5% by weight of $TiO_2$, respectively, was obtained. The hydrosol was converted to an organosol in methanol of 20% solids by repeating the procedure of Example 2.

Example 8

The procedure of Example 1 was followed except that the aqueous solution of stannic chloride was replaced in Part 3 with 60 g (6 g as $ZrO_2$) of an aqueous solution of zirconium oxychloride containing 10% solids as $ZrO_2$. A titanium dioxide hydrosol coated with $SiO_2$ and $ZrO_2$ at a proportion both of 15% by weight of $TiO_2$ was obtained. The hydrosol was then converted to an organosol in methanol of 20% solids by repeating the procedure of Example 2.

Example 9

Preparation of Antimony Pentaoxide Sol (Liquid C)

To a 2 L glass beaker were added 200 g of antimony trioxide (PATAX-CF, Nippon Seiko Co., Ltd.) and 146.67 g of 30% hydrogen peroxide solution (44 g as $H_2O_2$). After diluting with water to a total weight of 2,000 g, the antimony trioxide suspension was placed in a flask equipped with a reflux condenser, heated at the reflux temperature for 1 hour and then cooled to 40° C. The reaction mixture was neutralized with diisopropylamine to pH 7.5 to obtain an antimony pentaoxide sol having 12% solids (Liquid C).

Part 1 Rutile-type Titanium Dioxide Hydrosol (Liquid A)
Same as Example 1
Part 2 Titanium Dioxide Hydrosol Treated with Silane Coupling Agent (Liquid B)
Same as Example 1.
Part 3 Coating of Titanium Dioxide Hydrosol To a 5 L glass beaker were added 120 g of aqueous solution of sodium silicate having a $SiO_2$ concentration of 10% (12 g as $SiO_2$), 2 g of 48% aqueous solution of sodium hydroxide and a sufficient amount of deionized water to make the total amount of the mixture to 1,200 g. To this solution was added dropwise the whole amount of Liquid B (40 g as $TiO_2$) with stirring over 15 minutes. The pH of the mixture was 10.

Then 3.3 g of Liquid C (0.4 g as $Sb_2O_5$) diluted with deionized water to 40 g was added to the reaction mixture. To the reaction mixture was added again 60 g of aqueous solution of stannic chloride having a $SnO_2$ concentration of 20% (12 g as $SnO_2$) over 90 minutes with concurrent addition of 48% aqueous solution of sodium hydroxide to keep the mixture at a pH of 10 during the reaction.

After the addition of stannic chloride, the reaction mixture was heated to 80° C. and adjusted the pH at 8 by adding 1% hydrochloric acid dropwise over 120 minutes. After cooling to 20° C., the reaction mixture was acidified to pH 3 with 10% aqueous solution of citric acid and subjected to ultrafiltration process using a ultrafiltration module (Model SLF-1053, Asahi Kasei Chemical Co., Ltd.). This process was continued until a $TiO_2$ concentration of 6% and an electroconductivity less than 600 μS/cm were reached in the sol while replenishing the same volume of fresh water as the filtrate removed.

The resulting desalted hydrosol was kept reflux state for 3 hours, cooled to 40° C., neutralized with diisopropylamine to pH 5, and finally concentrated to 20% solids using a ultrafiltration module. A titanium dioxide hydrosol having a coating of $SiO_2$, $SnO_2$ and $Sb_2O_5$ in the form of hydrate at a proportion of 30%, 30% and 1%, respectively, by weight of $TiO_2$ was obtained.

The titanium dioxide hydrosol thus produced was diluted to a $TiO_2$ concentration of 5% with methanol and subjected to solvent substitution process using a ultrafiltration module (Model SLP-1053, Asahi Kasei Chemical Co., Ltd.) while replenishing the same volume of methanol as the filtrate removed. Finally, the supply of replenishing methanol was stopped and the sol was concentrated to obtain an organosol in methanol having 20% solids and a water content less than 1%.

Example 10

The procedure of Example 9 was followed except that both the amount of aqueous solution of sodium silicate and the amount of aqueous solution of stannic chloride were decreased to half (60 g as $SiO_2$ and 30 g $SnO_2$) while the amount of Liquid C (antimony pentaoxide sol) was doubled (6.6 g as $Sb_2O_5$) in Part 3. An organosol of titanium dioxide in methanol having a coating layer containing $SiO_2$, $SnO_2$ and $Sb_2O_5$ in the form of hydrate at a proportion of 15%, 15% and 2% by weight of $TiO_2$ was obtained.

Example 11

The titanium dioxide hydrosol having a $TiO_2$ concentration of 6% obtained in Example 3 before concentrating to the final $TiO_2$ concentration of 20% was refluxed for 3 hours and then cooled to 40° C. A solution of 4 g of methyltrimethoxysilane in 216 g of methanol was added to the cooled hydrosol dropwise over 15 minutes and aged for 12 hours at 30° C. After adjusting the pH at 5, the hydrosol was concentrated to 20% solids using an ultrafiltration module and then diluted with methanol to a $TiO_2$ concentration of 5%. The diluted sal was subjected to solvent substitution process using an ultrafiltration module (Model SLP-1053, Asahi Kasei Chemical Co., Ltd.) while replenishing the same volume of methanol as the removed filtrate. Finally, the supply of replenishing methanol was terminated and the sol was concentrated to obtain an organosol of titanium dioxide in methanol having 20% solids and a water content less than 1%.

Example 12

The procedure of Example 11 was followed except that the titanium dioxide hydrosol was replaced with the hydrosol of Example 5 before solvent substitution. An organosol of titanium dioxide surface treated with methyltrimethoxysilane in methanol having 20% solids was obtained.

Example 13

The procedure of Example 4 was followed except that 120 g of 30% hydrogen peroxide solution (36 g as $H_2O_2$) was replaced for the silane coupling agent (KBM-403) in Part 2 to stabilize the titanium dioxide hydrosol.

Example 14

Part 1 Anatase-type Titanium Dioxide Hydrosol

According to the known method, metatitanic acid was produced by the thermal hydrolysis of aqueous solution of titanyl sulfate. The resulting mixture was neutralized with 28% ammonia water to pH 7.0, filtered to collect precipitates and then washed with water. The filter cake was suspended in water and peptized with 36% hydrochloric acid with stirring to obtain an anatase-type titanium dioxide hydrosol having a pH 0.7 and 20% solids. The X-ray diffraction pattern of dried powder obtained by drying the hydrosol at 100° C. demonstrated the anatase crystalline form having a crystal size of 6 nm.

Using the anatase-type titanium dioxide hydrosol thus produced, the procedure of Example 4 was followed to obtain an organosol of anatase-type titanium dioxide in methanol having 20% solids.

Comparative Example 1

The titanium dioxide hydrosol produced in Part 1 of Example 1 was used as Comparative Example 1.

Comparative Example 2

The procedure of Example 1 was repeated up to Part 2 except that aminosilane (KBM-903, Shin-Etsu Chemical Industry Co., Ltd.) was used as a stabilizer. Then the resulting hydrosol was solvent substituted with methanol to obtain an organosol.

Evaluation Test of Sols

The sols obtained in Examples and Comparative Examples were evaluated for transparency (haze), stability with time and light resistance according the following methods.

Transparency:

Test samples were prepared by diluting each sol to 0.5% solids. A quartz cell having an optical path length of 10 cm was filled with sample and the haze value of the sample was determined using a haze meter (Model NHD-2000, Nippon Denshoku Kogyo Co., Ltd). The smaller of the haze value the better.

Stability with Time:

The sol was stored at a constant temperature of 5° C. for one month and the change of appearance was visually observed.

A: no change
B: increased viscosity
C: gelling or phase separation
The results are shown in Table 1.

Examples 15-26 and Comparative Example 3

Coating Composition 12.5 parts of 3-glycidoxypropyltrimethoxysilane (KBM-403, Shin-Etsu Chemical Industry Co., Ltd.) was reacted with 4.4 parts of 0.01 N hydrochloric acid for 24 hours with stirring. To the reaction mixture were added 62.5 parts of a titanium dioxide sol (20% solids) prepared in Examples and Comparative Examples, 15 parts of propylene glycol monomethyl ether, 56 parts of methanol, a trace amount of curing agent (aluminum acetylacetonate) and a small amount of leveling agent (L-7001, Toray Dow Corning Corp.) with stirring.

Evaluation of Coating Composition

The coating composition of Examples and Comparative Examples were evaluated for transparency (haze), stability with time and light resistance according to the following methods.

Transparency:

A quartz cell having an optical path length of 10 cm was filled with each composition and the haze value was determined using a haze meter (Model NHD-2000, Nippon Denshoku Co., Ltd.). The smaller of the value the better.

Stability with Time:

The coating composition was stored at a constant temperature of 5° C. for one month and the change of appearance was visually observed.

A: no change
B: increased viscosity
C: gelling or phase separation

Light Resistance:

The coating composition was sealed in a transparent glass container and then irradiated with black light for 4 hours and 24 hours. The degree of yellowing or blueing was visually observed and judged according to the following schedule.

+3: remarkable yellowing
+2: slight yellowing
+1: very slight yellowing
0: No yellowing
−1: very slight blueing
−2: slight blueing
−3: remarkable blueing

TABLE 1

| | | | | Evaluation of sol | | | | | |
| --- | --- | --- | --- | --- | --- | --- | --- | --- | --- |
| | | Crystalline | | Coating, % | | | | | Transparency |
| | Medium | form | pH | $SiO_2$ | $SnO_2$ | $Al_2O_3$ | $ZrO_2$ | $Sb_2O_5$ | Stability | (haze), % |
| Ex. 1 | water | rutile | 7 | 15 | 15 | 0 | 0 | 0 | A | 11 |
| Ex. 2 | methanol | rutile | — | 15 | 15 | 0 | 0 | 0 | A | 18 |
| Ex. 3 | water | rutile | 7 | 15 | 0 | 0 | 0 | 0 | A | 9 |
| Ex. 4 | methanol | rutile | — | 15 | 0 | 0 | 0 | 0 | A | 12 |
| Ex. 5 | methanol | rutile | — | 30 | 30 | 0 | 0 | 0 | A | 19 |
| Ex. 6 | methanol | rutile | — | 30 | 0 | 0 | 0 | 0 | A | 17 |
| Ex. 7 | methanol | rutile | — | 15 | 0 | 5 | 0 | 0 | A | 21 |
| Ex. 8 | methanol | rutile | — | 15 | 0 | 0 | 15 | 0 | A | 22 |
| Ex. 9 | methanol | rutile | — | 30 | 30 | 0 | 0 | 1 | A | 20 |
| Ex. 10 | methanol | rutile | — | 15 | 15 | 0 | 0 | 2 | A | 18 |
| Ex. 11 | methanol | rutile | — | 15 | 0 | 0 | 0 | 0 | A | 10 |
| Ex. 12 | methanol | rutile | — | 30 | 30 | 0 | 0 | 0 | A | 16 |
| Ex. 13 | methanol | rutile | — | 15 | 0 | 0 | 0 | 0 | A | 21 |
| Ex. 14 | methanol | anatase | — | 15 | 0 | 0 | 0 | 0 | A | 22 |
| Com. Ex. 1 | water | rutile | 2 | 0 | 0 | 0 | 0 | 0 | A | 16 |
| Com. Ex. 2 | methanol | rutile | — | 0 | 0 | 0 | 0 | 0 | A | 48 |

The results are shown in Table 2.

TABLE 2

| | | Evaluation of coating composition | | | |
|---|---|---|---|---|---|
| | | | Transparency | Light resistance | |
| | Sol | Stability | (haze), % | 4 hrs. | 24 hrs. |
| Ex. 15 | Ex. 2 | ○ | 42 | 0 | −1 |
| Ex. 16 | Ex. 4 | ○ | 39 | −1 | −2 |
| Ex. 17 | Ex. 5 | ○ | 43 | 0 | −1 |
| Ex. 18 | Ex. 6 | ○ | 39 | −1 | −2 |
| Ex. 19 | Ex. 7 | ○ | 48 | −1 | −2 |
| Ex. 20 | Ex. 8 | ○ | 49 | 0 | −1 |
| Ex. 21 | Ex. 9 | ○ | 42 | 0 | 0 |
| Ex. 22 | Ex. 10 | ○ | 46 | +1 | +1 |
| Ex. 23 | Ex. 11 | ○ | 41 | −1 | −2 |
| Ex. 24 | Ex. 12 | ○ | 36 | 0 | −1 |
| Ex. 25 | Ex. 13 | ○ | 50 | −1 | −2 |
| Ex. 26 | Ex. 14 | ○ | 42 | −1 | −2 |
| Comp. Ex. 3 | Comp. Ex. 2 | ○ | 73 | −3 | −3 |

Examples 27-38 and Comparative Example 4

Evaluation of Coated Optical Member

A plastic lens having a refraction index of 1.67 made of thiourethane-type resin was soaked in 13% aqueous solution of sodium hydroxide for 5 minutes, thoroughly washed with water and dried. A coating composition of Examples 15-26 and Comparative Example 3 was applied on the lens by the dipping method using a microdip coater (ND 0408, SDI, Co., Ltd.) at a pulling up speed of 16.5 mm/sec. and cured at 25° C. for 15 minutes, at 80° C. for 30 minutes and at 150° C. for 60 minutes, successively, to obtain a dry film thickness of 2 μm. The coated lenses were tested for transparency, refraction index, scratch resistance and light resistance according to the following methods.

Transparency:

A fluorescent lamp was shaded with the coated lens and the degree of cloudiness of the lens was visually judged according to the following schedule.

A: not clouded
B: very slightly clouded
C: slightly clouded

Refraction Index:

The refraction index of lens was measured on an ellipsometer (Model DVA-FL3G, Mizojiri Kogaku Kogyosyo Co., Ltd.).

Scratch Resistance:

A mass of #0000 steel wool (Nippon Steel Wool Co., Ltd.) was reciprocated 10 times on the lens surface under a load of 300 g/cm² and the state of lens surface was visually judged according to the following schedule.

A: not scratched at all
B: Almost not scratched
C: Slightly scratched
D: Largely scratched Light Resistance:

After the lens was exposed to light for 300 hours in a sunshine weathermeter, the state of lens surface was visually observed. Lenses not observed decrease in transparency, and free from coloring and/or cracks were judges as "good". The results are shown in Table 3.

TABLE 3

| | | | Evaluation of optical element | | | |
|---|---|---|---|---|---|---|
| | | | Optical element | | | |
| | Coating composition | Sol | Transparency (haze), % | Refraction index | Scratch resistance | Light resistance |
| Ex. 27 | Ex. 15 | Ex. 2 | B | 1.67 | B | Good |
| Ex. 28 | Ex. 16 | Ex. 4 | A | 1.69 | A | Good |
| Ex. 29 | Ex. 17 | Ex. 5 | B | 1.65 | B | Good |
| Ex. 30 | Ex. 18 | Ex. 6 | A | 1.65 | A | Good |
| Ex. 31 | Ex. 19 | Ex. 7 | B | 1.66 | B | Good |
| Ex. 32 | Ex. 20 | Ex. 8 | B | 1.65 | B | Good |
| Ex. 33 | Ex. 21 | Ex. 9 | B | 1.63 | A | Good |
| Ex. 34 | Ex. 22 | Ex. 10 | B | 1.66 | A | Good |
| Ex. 35 | Ex. 23 | Ex. 11 | B | 1.70 | B | Good |
| Ex. 36 | Ex. 24 | Ex. 12 | A | 1.69 | A | Good |
| Ex. 37 | Ex. 25 | Ex. 13 | B | 1.68 | A | Good |
| Ex. 38 | Ex. 26 | Ex. 14 | B | 1.61 | B | Good |
| Comp. Ex. 4 | Comp. Ex. 3 | Comp. Ex. 2 | C | 1.68 | D | Crack |

The invention claimed is:

1. A titanium dioxide sol composition comprising titanium dioxide sol particles having a coating layer thereon and a liquid dispersion medium of the sol, said coating layer comprising, in the following radially-inner to radially-outer order:
   (i) hydrated silica in a proportion calculated as $SiO_2$ from 10 to 40% by weight of said titanium dioxide sol particles calculated as $TiO_2$, and
   (ii) at least one hydrated metal oxide selected from the group consisting of tin oxide, aluminum oxide and zirconium oxide in a proportion calculated as sum of $SnO_2$, $Al_2O_3$ and $ZrO_2$ from 2 to 40% by weight of said titanium dioxide sol particles calculated as $TiO_2$.

2. The titanium dioxide sol composition according to claim 1 wherein said coating layer further comprises:
   hydrated antimony oxide in a proportion calculated as $Sb_2O_5$ from 0.5 to 10% by weight of said titanium dioxide sol particles calculated as $TiO_2$, disposed radially outwardly relative to said hydrated silica and radially inwardly or outwardly relative to said at least one metal oxide or together with said at least one metal oxide.

3. The titanium dioxide sol composition according to claim 2, wherein said titanium dioxide sol particles comprise tin dioxide at a weight ratio of $SnO_2/TiO_2$ of less than 0.2, and zirconium dioxide at a weight ratio of $ZrO_2/TiO_2$ of less than 0.1.

4. The titanium dioxide sol composition according to claim 2, wherein said liquid dispersion medium is a water-miscible organic solvent.

5. The titanium dioxide sol composition according to claim 1, wherein said titanium dioxide sol particles comprise tin dioxide at a weight ratio of $SnO_2/TiO_2$ of less than 0.2 and zirconium dioxide at a weight ratio of $ZrO_2/TiO_2$ of less than 0.1.

6. The titanium dioxide sol composition according to claim 1, wherein said liquid dispersion medium is a water-miscible organic solvent.

7. A process for producing a stable titanium dioxide sol composition comprising the steps of:
(a) providing a titanium dioxide hydrosol;
(b) adding to said titanium oxide hydrosol a stabilizer selected from the group consisting of hydrogen peroxide, an aliphatic or aromatic hydroxy-carboxylic acid, and an alkoxysilane compound of the formula:

$$R^1{}_n SiX_{4-n}$$

wherein $R^1$ is $C_1$-$C_8$ alkyl, glycidoxylated $C_1$-$C_8$ alkyl or $C_2$-$C_8$ alkenyl, X is alkoxy, and n is 0 or 1;
(c) adding the stabilized titanium dioxide hydrosol prepared in step (b) to a solution of a water-soluble silicate salt or silica sol containing an amount of alkali sufficient to keep the mixture alkaline at a pH higher than 9 after said titanium dioxide hydrosol has been added;
(d) adding to the mixture at least one oxide or water-soluble salt of a metal selected from the group consisting of tin, aluminum and zirconium after said stabilized titanium dioxide hydrosol has been added in step (c) while keeping the pH of the mixture above 9;
(e) adjusting the pH of the mixture lower than 8, and
(f) removing electrolytic contaminants from the mixture.

8. The process according to claim 7, wherein the particles of said titanium dioxide hydrosol comprise tin dioxide at a weight ratio of $SnO_2/TiO_2$ of less than 0.2 and zirconium dioxide at a weight ratio of $ZrO_2/TiO_2$ of less than 0.1.

9. The process according to claim 7, wherein said solution of water-soluble silicate salt or silica sol contains the silicate salt or silica sol calculated as $SiO_2$ from 10 to 60% by weight of said titanium dioxide hydrosol calculated as $TiO_2$.

10. The process according to claim 7, wherein the amount of said oxide or water-soluble salt added to said mixture calculated as sum of $SnO_2$, $Al_2O_3$ and $ZrO_2$ is 10 to 40% by weight of said titanium dioxide hydrosol calculated as $TiO_2$.

11. The process according to claim 10 further comprising the step of adding an antimony pentaoxide sol to said solution of a water-soluble silicate salt or silica sol before, concurrently with or after the addition of said at least one oxide or water-soluble salt of a metal selected from the group consisting of tin, aluminum and zirconium.

12. The process according to claim 11, wherein the amount of said antimony pentaoxide sol calculated as $Sb_2O_5$ is from 0.5 to 10% by weight of said titanium dioxide hydrosol calculated as $TiO_2$.

13. The process according to claim 7 further comprising the step of adjusting pH of the titanium dioxide sol composition in a range between 4 and 10 after the step (f).

14. The process according to claim 7 further comprising the step of substituting the liquid dispersing medium of said titanium dioxide sol composition with a water-miscible organic solvent.

15. A coating composition for forming a transparent film on the surface of an optical element comprising the titanium dioxide sol composition obtained by the process according to claim 7 and a curable binder.

16. An optical element which comprises an optical substrate and a cured film made of the coating composition of claim 15 formed on the surface of said optical substrate.

* * * * *